United States Patent [19]

O'Connell

[11] 4,360,056
[45] Nov. 23, 1982

[54] GEOKINETIC ENERGY CONVERSION

[75] Inventor: Thomas F. O'Connell, Spencertown, N.Y.

[73] Assignee: Spencertown Geo-Solar Associates, Spencertown, N.Y.

[21] Appl. No.: 131,741

[22] Filed: Mar. 19, 1980

[51] Int. Cl.³ .............................................. F25D 23/12
[52] U.S. Cl. .......................................... 165/45; 62/260
[58] Field of Search ............................ 165/45; 62/260; 126/236; 60/641.1, 641.2, 641.3

[56] References Cited

U.S. PATENT DOCUMENTS

| | | | |
|---|---|---|---|
| 2,689,090 | 9/1954 | Wetherbee | 62/260 |
| 2,932,170 | 4/1960 | Patterson | 62/260 |
| 3,847,207 | 11/1974 | Weber | 165/45 |
| 3,950,958 | 4/1976 | Loofbourow | 62/260 |
| 3,965,694 | 6/1976 | Vignal | 62/260 |
| 3,986,344 | 10/1976 | Newman | 62/260 |
| 4,042,012 | 8/1977 | Perry | 62/260 |
| 4,049,045 | 9/1977 | Moog et al. | 165/12 |
| 4,054,176 | 10/1977 | Van Huisen | 165/45 |
| 4,062,489 | 12/1977 | Henderson | 165/18 |
| 4,205,718 | 6/1980 | Balch | 165/45 |
| 4,210,201 | 7/1980 | O'Hanlon | 126/436 |
| 4,211,207 | 7/1980 | Molivadas | 126/433 |
| 4,237,963 | 12/1980 | Girard | 62/260 |
| 4,257,239 | 3/1981 | Partin | 62/260 |
| 4,277,946 | 7/1981 | Bottum | 62/260 |
| 4,279,291 | 7/1981 | Lambert | 62/260 |

*Primary Examiner*—Daniel J. O'Connor
*Attorney, Agent, or Firm*—Morgan, Finnegan, Pine, Foley & Lee

[57] ABSTRACT

An energy conversion system employing a heat transducer and a set of heat exchange earth fields. The connection of the fields to the heat transducer is controllably variable. The fields are used to extract or dissipate heat according to whether a heating or cooling effect is desired. The heat gain, or heat loss in the case of cooling, is a function of the geothermal energy of the earth, as modulated by solar radiation.

18 Claims, 13 Drawing Figures

TO AND FROM FIELDS

GEOKINETIC ENERGY CONVERSION

BACKGROUND OF THE INVENTION

This invention relates to energy conversion, and, more particularly, to geokinetic energy conversion in which the earth is temperature modulated by solar radiation, and is used as a source or sink for heat. The term "geokinetic" refers to the fact that the geothermal energy of the invention varies by solar radiation.

The earth is a store of an almost inexhaustible amount of heat energy. Not only does the earth have a molten, i.e. geothermal, core which is at a relatively high temperature, it is continually being heated by the sun in a seasonally changing, i.e. kinetic, pattern.

Although the possibility of using both geothermal and solar energy has been known for many years, it has been difficult to do so in an efficient and economical manner. As a result, geothermal and solar energy largely have been ignored in favor of fossil fuels, which have been widely available at relatively low cost. Now that shortages are appearing and the cost of fossil fuels has increased, and is increasing, there have been renewed efforts to make use of both geothermal and solar energy.

In one of these efforts, a large hole is formed in the ground and filled with water. A heat exchange tube with a recirculatable fluid is immersed in the water and connected to a heat pump within a structure that is to be heated in winter, or cooled in summer. Heating and cooling are possible because a heat pump can be operated reversably. The water in the hole couples with the recirculatable fluid to the latent or potential heat of the earth. In the heating mode the heat extracted from the earth by the recirculatable fluid is released by the heat pump within the structure being heated. The converse takes place in cooling. The objection is that for efficient heat exchange the hole must be relatively large and deep. In addition, many solids will not support the required amount of water. In such a situation, an additional source of water is required to keep the system operating.

There is also the objection that the system tends to become saturated, i.e. less able to absorb or dissipate heat and thus less efficient, during long term operation. There is the further objection that additional energy such as that required for pumps is often needed to keep the large hole filled with water. In some cases an auxiliary source of water is required.

In an attempt to increase the efficiency of the water-hole system, water is circulated directly from the hole, instead of acting as a coupling between the earth and a recirculatable fluid. This method has many disadvantages. It requires frequent cleansing of the heat transfer surfaces and there is an intensified corrosion problem through continued agitation of the water from the hole. Again a significant amount of pump energy is required.

A related effort has made use of secondary heat exchanger pipes buried at a suitable depth in the ground. This approach uses fluid circulated through the pipes and then to a heat exchanger. The burying of the pipes eliminates the need for the digging of a large hole and filling it with water. But this technique generally produces a lower transfer of energy, and becomes progressively less effective, in part because of saturation, with sustained usage. Furthermore, the buried pipe must be of considerable length in order to achieve even marginal heat conversion for any sustained period. The need for a long pipe means that a large capacity pump must be used for even minimal water circulation.

Nevertheless, even when geothermal and solar methods are less economical than fossil fuels, they have the advantage of producing less environmental pollution.

Accordingly, it is an object of the invention to facilitate both the geothermal and solar conversion of energy. A related object is to achieve conversion efficiencies which approach those of fossil fuels. Another related object is to conserve on fossil fuels in both solid and fluid form.

A further object of the invention is to achieve geothermal and solar energy conversion with mitigation of the disadvantages that characterize prior systems. In particular, it is an object of the invention to increase the long term efficiency of coupling between the earth and a geothermal and solar conversion system. A related object is to increase the usefulness of prior geothermal and solar systems. Another related object is to achieve efficient geothermal and solar conversion of energy without the need for large-scale water filled holes, or the need for the circulation of potentially corrosive liquids. A further object is to overcome the disadvantage of geothermal systems employing long pipes.

A still further object of the invention is to enhance the performance of geothermal and solar piping systems. A related object is to reduce the saturation effect that has attended the use of such systems.

SUMMARY OF THE INVENTION

In accomplishing the foregoing and related objects, the invention provides for the use of a plurality of piping fields that are buried in the earth and are used to circulate a fluid that is controllably and variably connected to a heat transducer. The term "heat transducer" is used in the sense of a device which converts heat in one energy state to heat in a different energy state.

The use of variable connections overcomes the saturation effect that previously prevented geothermal conversion systems from becoming widely accepted and from operating efficiently. The use of variable connections also reduces the average pumping requirement.

In accordance with one aspect of the invention, the fluid that circulates in the piping fields is advantageously water. However, any circulatable fluid may be used, and under some conditions, a freeze resistant fluid or an antifreeze additive may be employed.

In accordance with another aspect of the invention, a controller connects the piping fields to the heat transducer on a timed cycle. In addition, the controller provides for dynamic alternation in the configuration, including length, of the total field. A further function of the controller is to connect the piping fields to the heat pump for prescribed intervals in accordance with ground conditions. In particular, an important ground condition is the extent of the moisture present since moisture serves to enhance the coupling between the piping field and the earth itself.

In accordance with a further aspect of the invention, the piping of the fields is embedded in sand and is closely coupled with the earth by having the sand moistened. This is advantageously achieved using a waste water system.

In accordance with yet another aspect of the invention, a heat exchanger is interposed between the heat transducer and the piping fields. This allows a closed loop for the circulation of the freeze resistant fluid between the exchanger and the heat pump whereas the fluid that then circulates in the piping fields can be ordinary water since the field is positioned at a depth below the earth where the problem of freezing is not likely to be encountered.

In accordance with still another aspect of the invention, it is desirable to use solar collectors as covers of cold frames that are positioned on the surface of the earth above the location of the various fields. In this way solar energy is used for the auxiliary heating of the field piping. This has been discovered to be an advantageous use of solar heat by comparison with the traditional use of solar panels in the form of roof collectors. This is because the solar heating supplements the natural heat extraction that takes place geokinetically in accordance with the invention.

In accordance with still another aspect of the invention, the natural tendency for the entry part of the field to cool over time is compensated by the control mechanism such that the portion of the field that experiences cooling is temporarily shunted or rendered inoperative in favor of other fields where the cooling has not taken place. When equilibrium is restored so that the initial portion of the field is again suitable for satisfactory heat exchange, it is re-entered into the system with advantageous effect.

In accordance with other aspects of the invention, the term "heat transducer" is used in the sense of apparatus for heating or cooling a building by transferring heat from or to reservoir fields outside the building. A simple form of such a heat pump is provided by the combination of a heat exchanger and a fan. The fields advantageously make use of piping, but can take other forms as well, such as tanks or other forms of reservoirs. The fields are advantageously connected in timed cycles, but other cycles may be used as well, such as pressure, volume and temperature. The controller desirably controls the length of the total field on a dynamic basis, but it may control the composition of the fields in other ways as well.

When the system is used for cooling, the fields are used to dissipate heat so that their coils are advantageously embedded in a fluid medium, such as a pond, to facilitate the heat dissipation.

A still further aspect of the invention involves the use of a field medium, such as sand, that enhances the geothermal coupling. Waste water from bathrooms and sinks may also be advantageously employed in the practice of the invention. The latent heat available from waste water may be used in place of heat from the field in the process of expediting field recovery or the attainment of equilibrium field operating condition, which maximizes the transfer of heat from the fields. In addition, the waste water may also be used to enhance geothermal coupling. The system may also make advantageous use of a four-way valve to change the direction of circulation of the field fluid. Heat exchange is a non-linear process with field length. This allows more uniform removal or dissipation of heat over the entire length. Where piping and tanks are used in the fields, they are preferably of a non-corrosive material such as concrete, polyethylene or polyvinylchloride. In addition the units are chosen to provide a desirable ratio between conductive surface and volume, taking fluid friction into account.

DESCRIPTION OF THE DRAWINGS

Other aspects of the invention will become apparent after considering several illustrative embodiments taken in conjunction with the drawings in which.

DETAILED DESCRIPTION

With reference to the drawings, FIGS. 1A through 1E set forth various relationships which provide background for the invention, in particular indicating how the invention provides for geokinetic conversion of energy in an advantageous way that surmounts many of the difficulties which have heretofore impeded the acceptance of this technology.

Figure 1A:
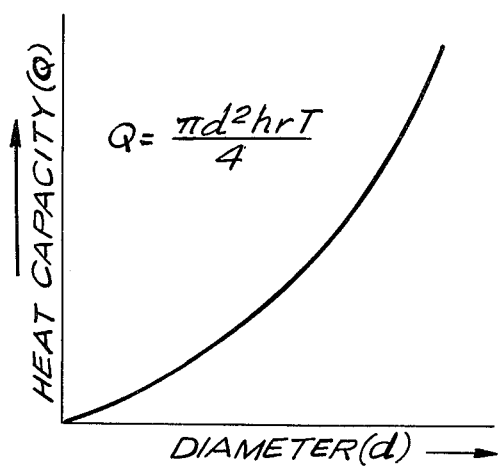
FIG. 1A is a graph illustrating the heat capacity of the earth.

Thus, FIG. 1A indicates the large quantities of heat that are available from the earth. It is to be noted that the total heat in a large mass of material at a relatively low temperature can provide a significantly higher temperature in a smaller mass of material. It is this principle which underlies the present invention. By utilizing heat in a sufficient mass of earth, it is possible to realize any desired level of heating (or cooling) in an interior structure. The law of conservation of energy is preserved since the total heat energy involved in the exchange is unchanged.

In FIG. 1A the ordinate or Y-axis quantity is heat capacity (Q) in millions of BTUs (British Thermal Units) per unit of depth, typically 100 feet. The abscissa or X-axis quantity is effective diameter, typically in feet of a cylinder of earth. The heat capacity of a cylinder of earth in accordance with FIG. 1A is given by equation (1) below $$Q = pd^2 hrT/4 \tag{1}$$

where
- p is "pi" which is 3.141659...,
- d is the diameter of the cylinder
- h is the depth of the cylinder,
- r is the product of the density of the soil and its specific heat, and
- T is temperature difference.

Thus, a cylinder of earth 30 feet in diameter and 100 feet in depth can release 28,000,000 BTUs if its temperature is lowered by only 10° Fahrenheit.

Figure 1B:
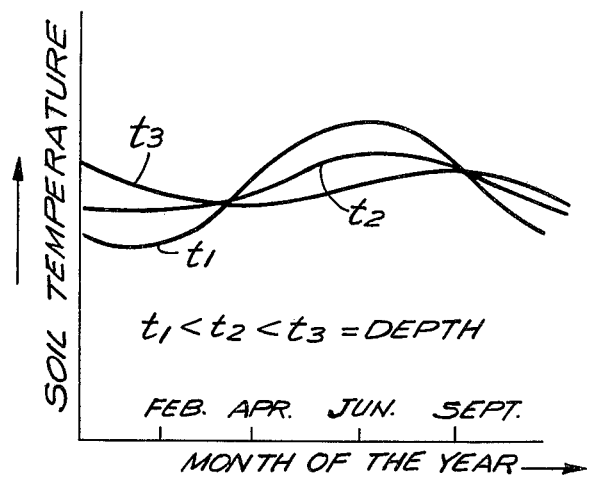
FIG. 1B is a set of graphs illustrating variation in soil temperature over the calendar year at various soil depths.

FIG. 1B illustrates the variation in soil temperature for seasonal changes. In the winter months the earth is at a lower temperature than in summer. In addition the degree of change in soil temperature between winter and summer is reduced the deeper in the earth that the temperature is measured.

Figure 1C:
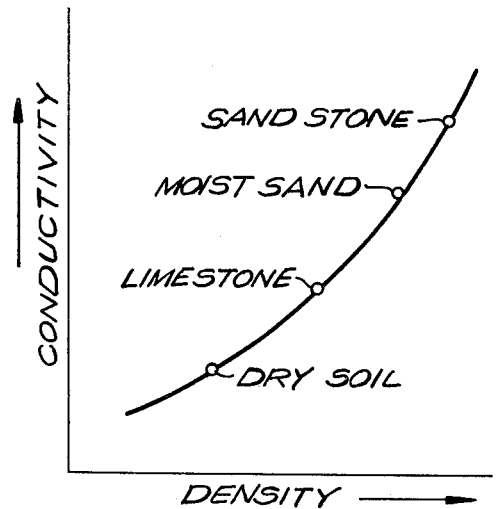
FIG. 1C is a graph illustrating the relationship between soil conductivity and soil density.

FIG. 1C shows the relationship between conductivity in kilo-BTUs per hour-foot squared in degrees Fahrenheit, compared with density in pounds per cubic foot. As density increases, thermal conductivity increases.

Figure 1D:
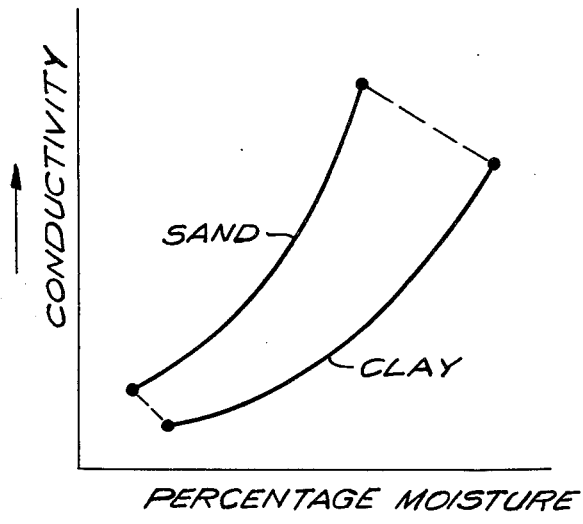
FIG. 1D is a set of graphs illustrating the relationship between soil conductivity and percentage moisture content for various materials.

There is also a similar correlation between thermal conductivity and moisture as indicated in FIG. 1D. As moisture increases thermal conductivity also increases. Furthermore, soil with a high clay content, as represented by the lower curve of the set of curves in FIG. 1D has a more gradual change of conductivity with percentage of moisture than does the uppermost curve, which applies to sand.

Figure 1E:
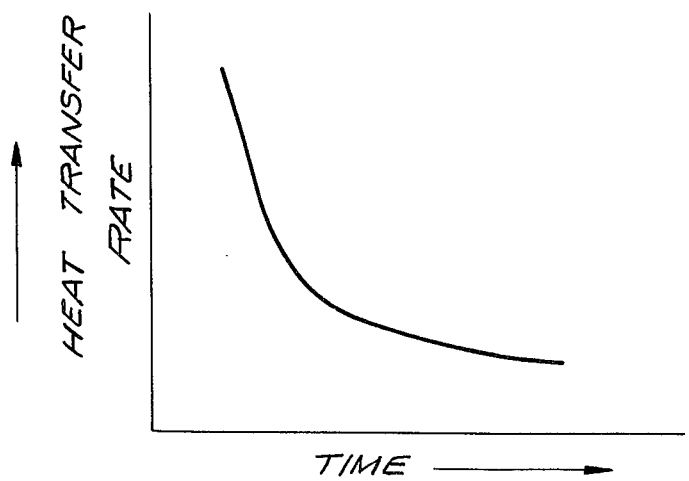
FIG. 1E is a graph illustrating the relationship between heat transfer rate and time.

Finally, FIG. 1E shows the variation of heat transfer with time. The heat transfer rate is in BTUs per hour and the time is in hours. The curve of FIG. 1E decays approximately exponentially with time and approaches a lower heat transfer rate as an asymptote. FIG. 1E shows that the initial heat rate is initially at a relatively high level but quickly decays to a much lower level. It is this phenomenon which has made prior geothermal conversion systems both inefficient and impractical. Although the prior systems gave hope that a suitable conversion could take place, the unfortunate end result has been that the initial rates of heat transfer could not be sustained and that the ultimate heat transfer rate has proved to be inefficient.

Nothwithstanding the shortcoming of a general approach to geothermal conversion, suggested by FIG. 1E, the fact remains that the earth is a significant source of heat energy as indicated by FIG. 1A and the invention overcomes the shortcomings associated with FIG. 1E.

Figure 2A:
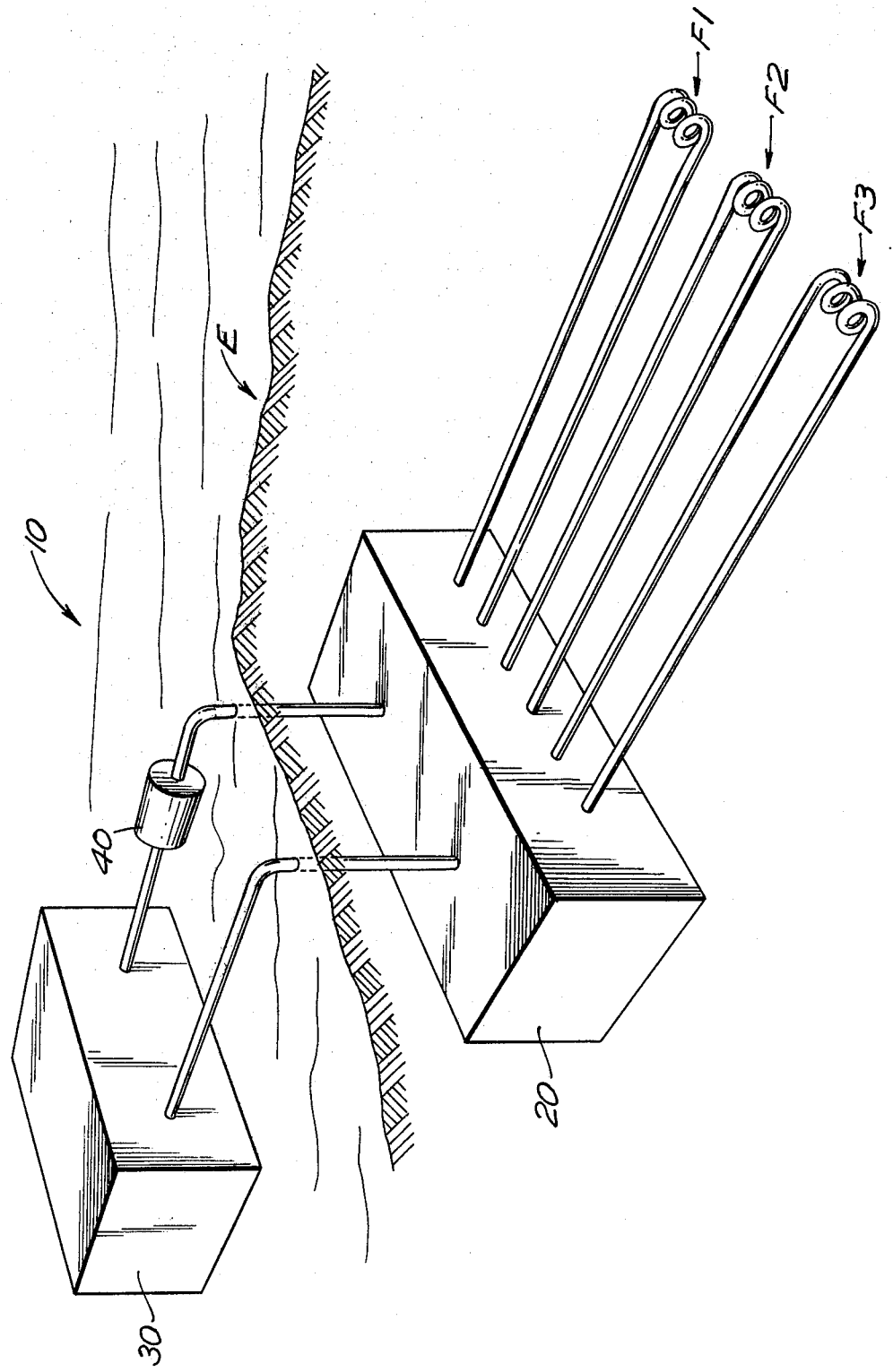
FIG. 2A is a perspective view of an illustrative geothermal conversion system in accordance with the invention.

With reference to FIG. 2A, an illustrative geokinetic conversion system 10 in accordance with the invention includes a plurality of field members F1, F2 and F3. The field members, which can take various forms such as piping and tanks, are buried at a suitable level below the surface of the earth E. They are controlled by a unit 20 which is in turn coupled to a heat transducer 30 and a fluid circulating pump 40, which may have a variable speed characteristic.

Fluid circulated in the fields F1, F2 and F3 absorbs or dissipates heat energy with respect to the earth at various positions of each field. The fluid with absorbed energy is returned to the unit 20 which applies the field energized fluid to the heat transducer 30 using the pump 40. The speed of the pump is desirably variable in accordance with field conditions, including field length and ground conditions, to improve heat transfer.

Figure 2B:
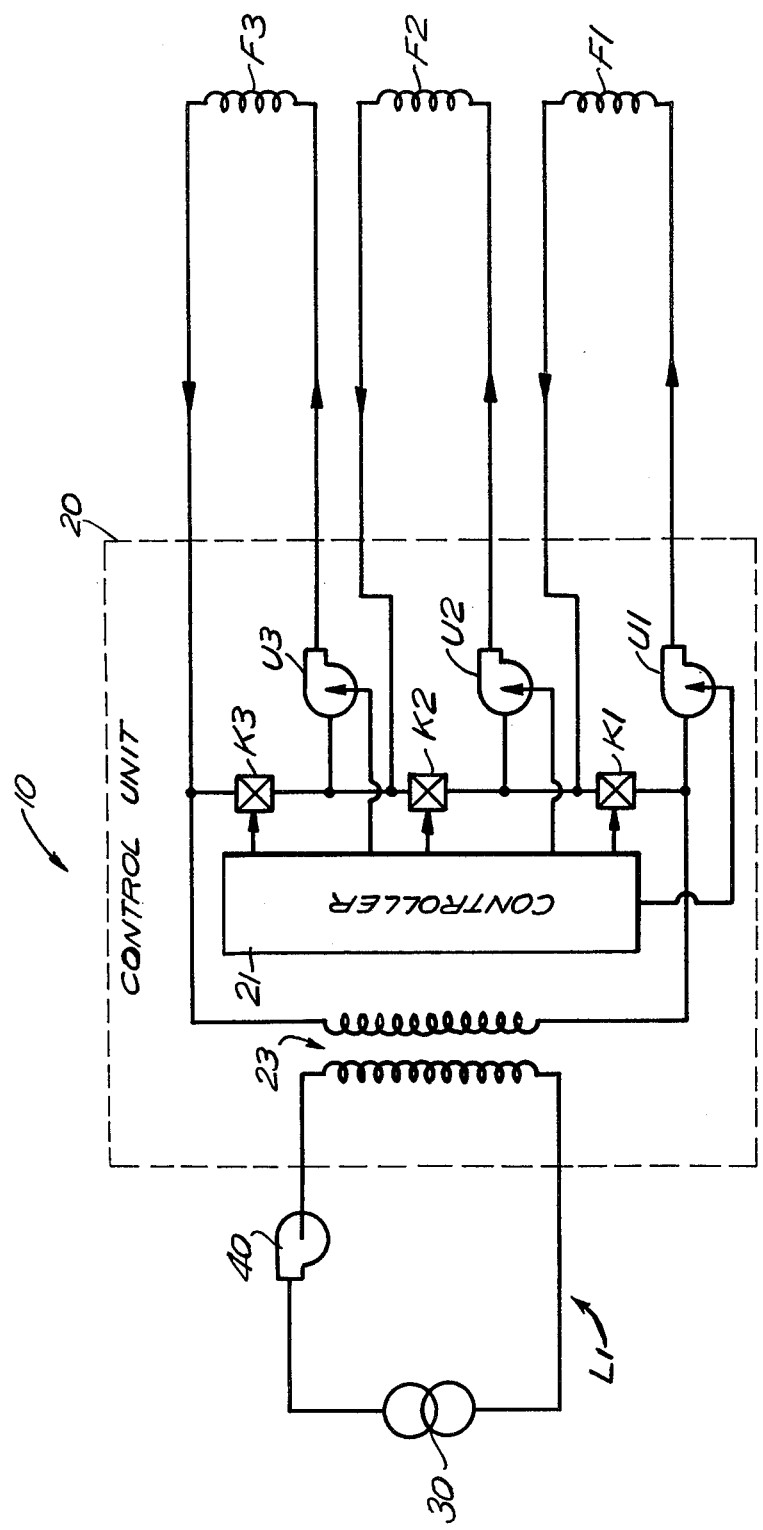
FIG. 2B is a schematic representation of the system of FIG. 2A.

A schematic representation of the system 10 of FIG. 2A is set forth in FIG. 2B. Each field F1, F2 and F3 is in a loop controlled by valves K1, K2 or K3. The mechanism 21 operates the valves K1, K2 or K3 in accordance with the invention and is discussed in connection with FIG. 3B below. The system of FIGS. 2A and 2B includes an intermediate heat exchanger 23. This is to permit the use of a freeze resistant fluid in the loop L1 that includes the heat transducer 30. As seen in FIG. 2A, the field members F1, F2 and F3 can be placed sufficiently below the surface of the earth E that the possibility of freezing is rendered remote. However the geothermically converted fluid which circulates in the heat transducer will be cooled during the heat exchange, giving rise to a possible freeze in the coil of the transducer. This is avoided by the use of a freeze resistant fluid. It will be understood that in some applications of the invention the intermediate heat exchanger 23 of FIG. 2B can be eliminated and the fluid circulated in the field coil can also be circulated through the heat transducer.

Figure 3A:
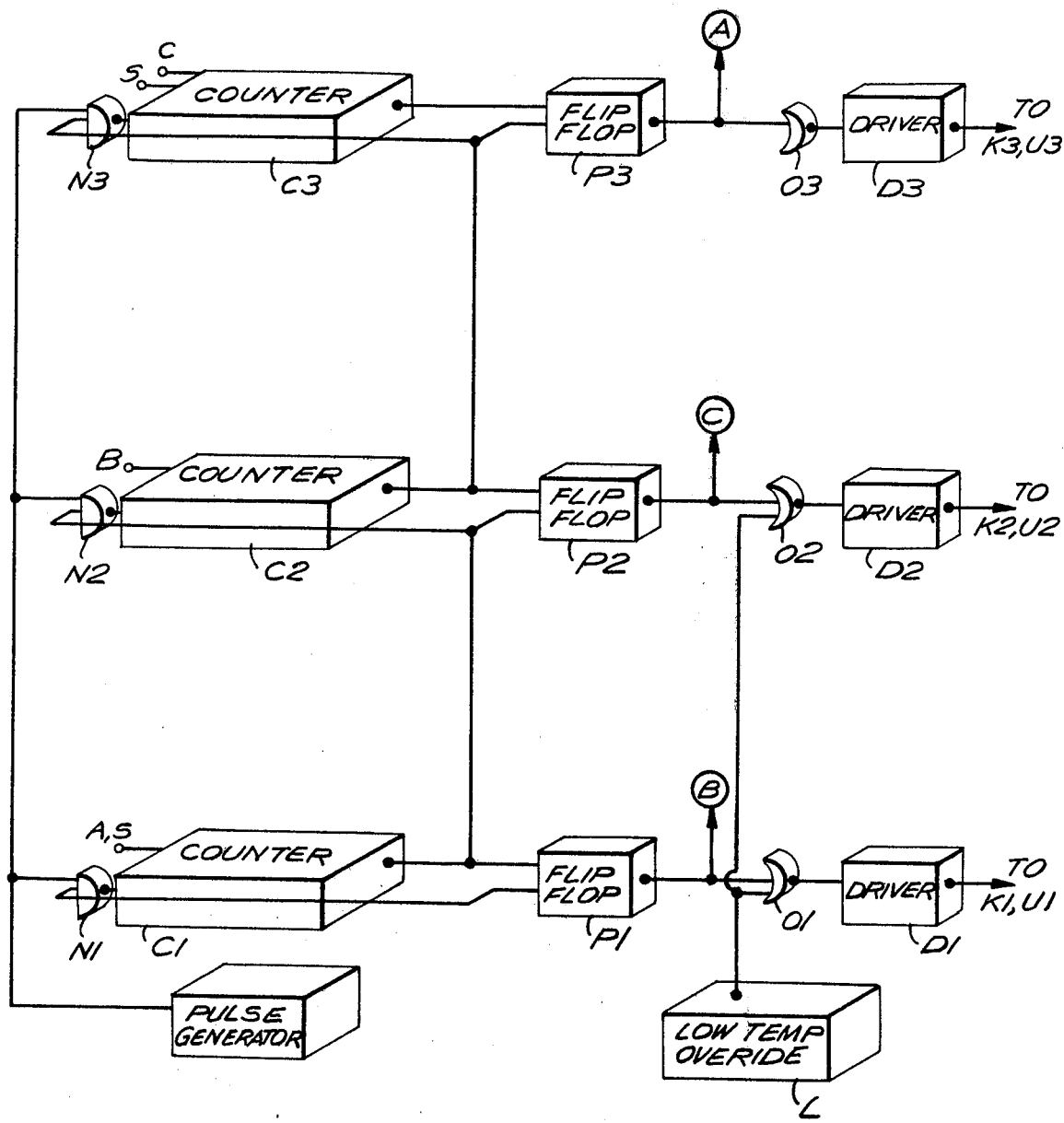
FIG. 3A is a perspective view of an illustrative control mechanism for the system of FIG. 2A.
Figure 3B:
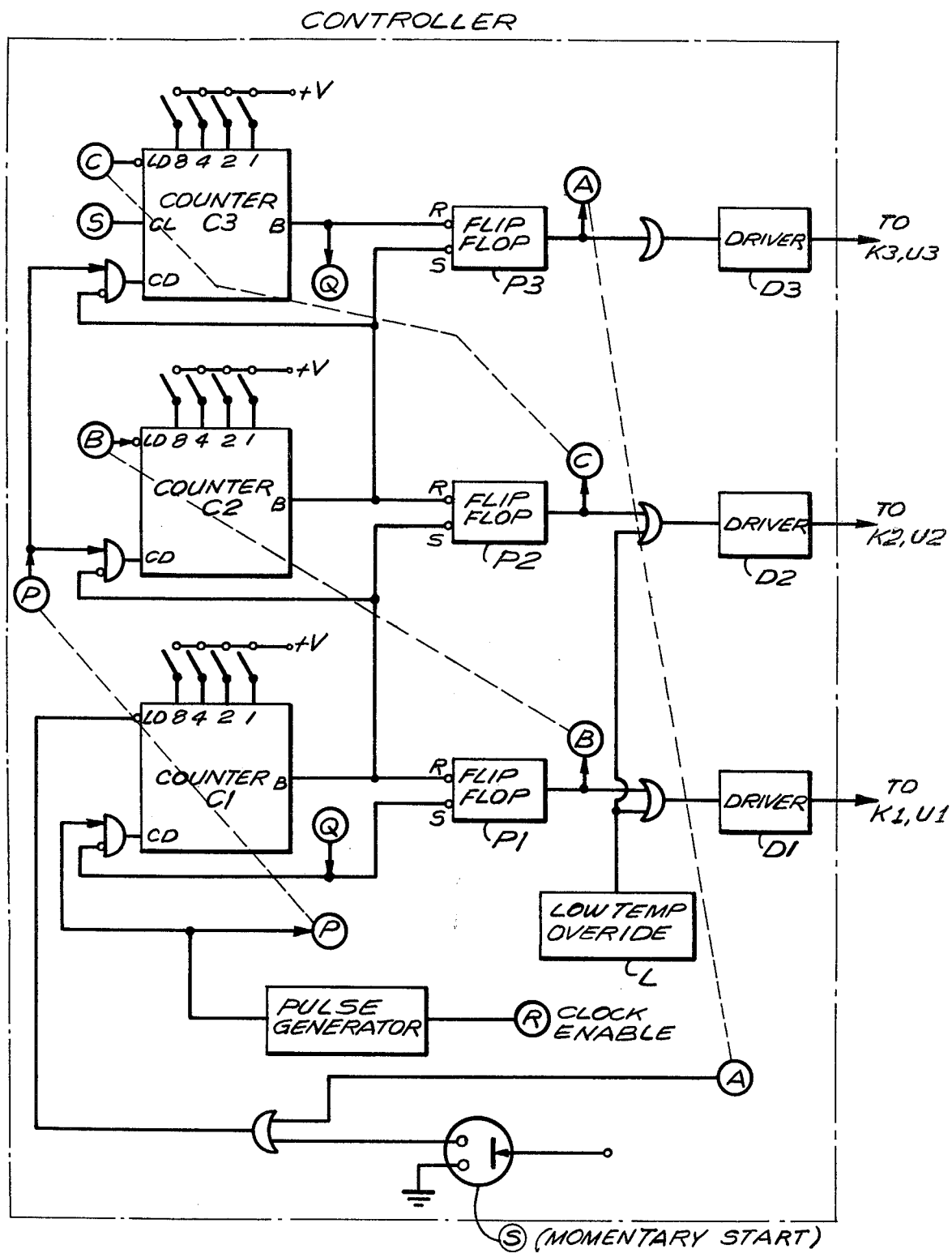
FIG. 3B is a block and schematic diagram of illustrative control circuitry for the mechanism of FIG. 3A.

A perspective view of a suitable controller is shown in FIG. 3A and illustrative circuitry for the controller is shown in FIG. 3B.

The circuitry of FIG. 3B makes use of separate counters C1, C2 and C3 for each ground field F1, F2 and F3. This allows a particular control valve K1, K2 or K3 to remain in an open or closed condition for a prescribed period of time. In addition, the counters C1, C2 and C3 are energized from one another in sequence. When the cycle is completed for one field, e.g. F2, the subsequent field, e.g. F3, is energized.

The counting control process can be interrupted at any point in time by an external control. A typical external control overrides the clock pulses that drive the counters. The interruption can take place by eliminating the clock pulse or by closing one or more of the fields. Each counter is initialized with a predefined count. This corresponds to the number of counts for a specified cycle.

The number of counts in a particular counter is governed by one or more parameters with the associated field. Such a parameter can be the density of FIG. 1C or the moisture content of FIG. 1D. The optimal count for each counter is established by testing for the particular geologic condition that exists during field operation.

As an example, an initial attempt can be made to optimize the system by assuming an equal distribution of load.

In such a case the fields F1, F2 and F3 are initially operated in sequence. Closure of the momentary start switch S loads counter C1 with a predetermined count governed by the closures of the counter switches in accordance with conditions under which each field is operated. At the end of the count interval, the flip-flop P1 is reset. This closes the valve K1, so that the flow is now through the fields F2 and F3. Simultaneously, counter C2 is loaded and begins its countdown. At the end of the counting interval, the associated flip-flop P2 is reset, closing the valve K2 so that the flow is now through field F3 alone. The foregoing procedure is continued until a closure sequence is established in which the circulation takes place through field F1, then through field F2, then through field F3.

In addition, the driver D1 through D3 control respective field pumps U1 through U3 in such a way that when any associated valve K1 through K3 is open, i.e. its field is not shunted, the pump is operating. Conversely, when any field is shunted, the associated field pump is inoperative.

Furthermore the pump rate of any pump may be varied, or used with a reversing valve, according to ground conditions in order to improve the heat transfer effect.

It will be understood that the foregoing sequence is merely illustrative, and that other sequences and flows may be employed in accordance with field conditions.

Figure 4A:
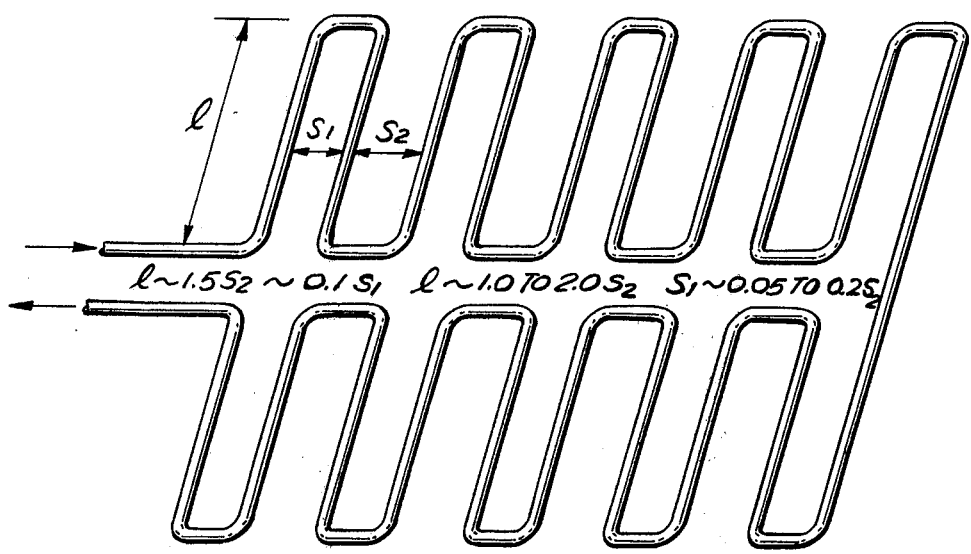
FIG. 4A is a schematic diagram of an illustrative field arrangement which provides advantageous geothermal conversion in accordance with the invention.

An alternative form of field piping is shown in FIG. 4A. This form has been found to be more efficient in effecting geothermal conversion than the conventional form of coiling that is commonly used in field coils. It will be understood that other configurations of piping may be used instead.

Figure 4B:
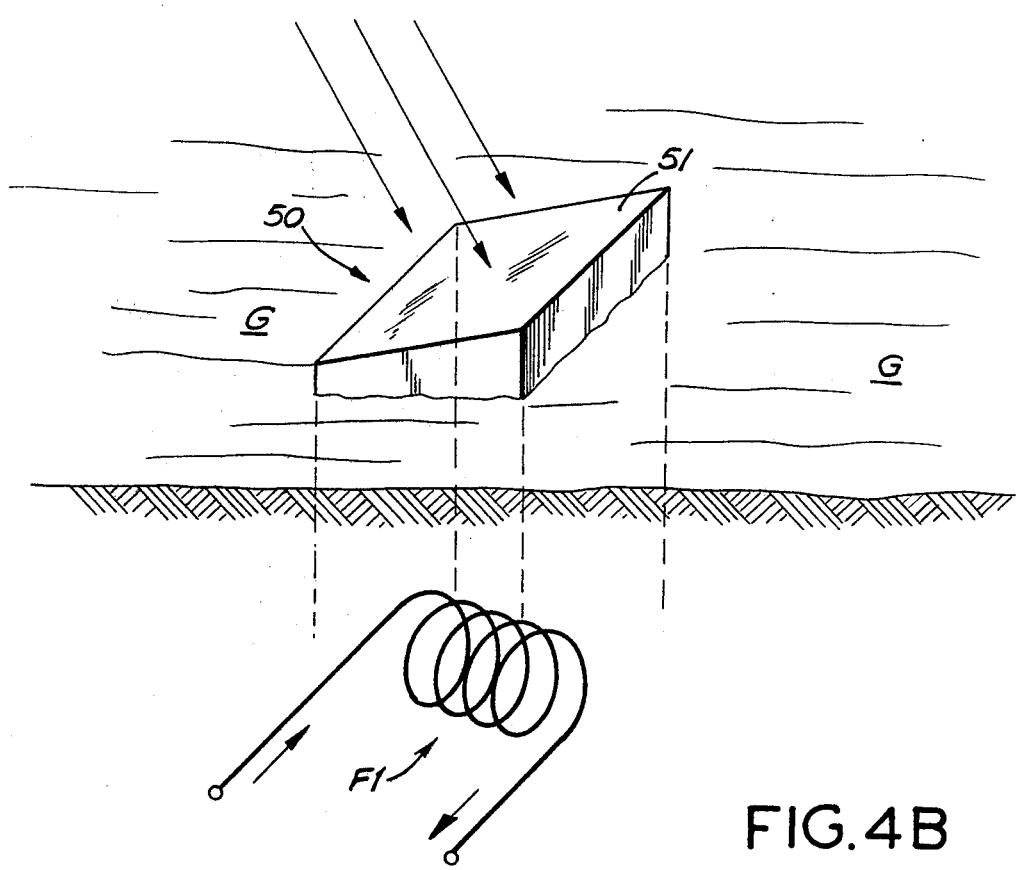
FIG. 4B is a schematic representation showing the use of a solar collector in accordance with the invention.

FIG. 4B illustrates the use of solar energy with the invention. A cold frame 50 is fitted with a solar collector 51 and positioned on the ground G above the location of the field coils, for example the illustrative field coil F1. It will be understood that other forms of solar collectors may be used with the invention as well.

Figure 4C:
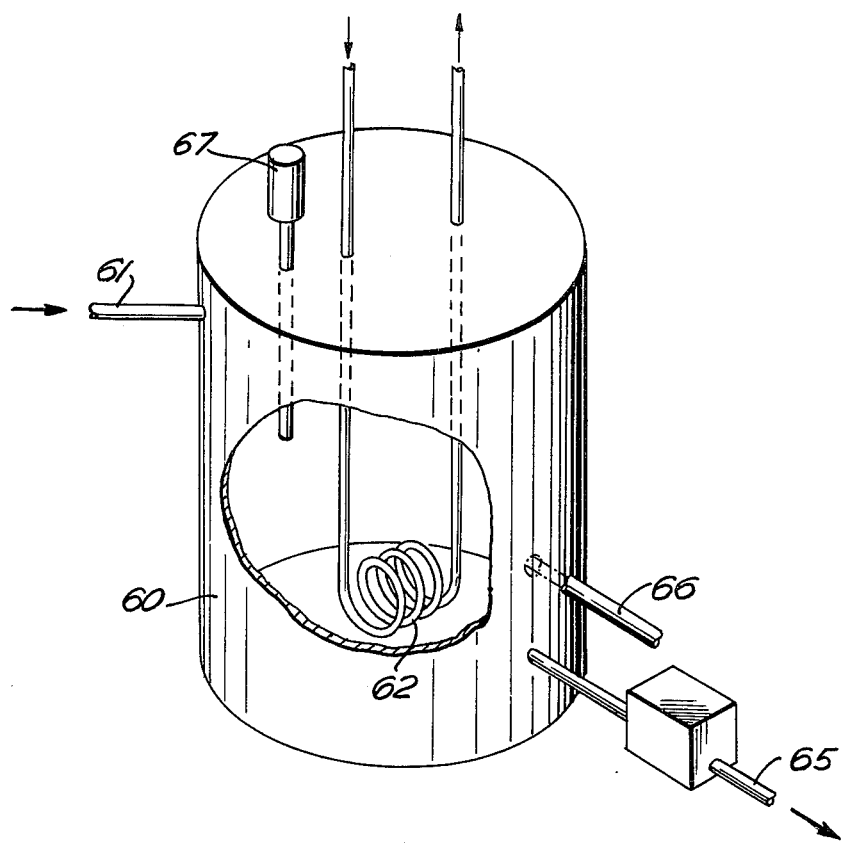
FIG. 4C is a schematic representation of a waste water unit being used to increase the coupling conductivity in accordance with the invention.

FIG. 4C shows the employment of waste water, e.g. water from laundry and shower activities, in accordance with the invention. The waste water is collected in a tank 60 from an inlet 61. A coil 62 in the tank 60 is connected into the field coil system, and controlled in the same fashion as the other field coils. Accordingly, the field coil in the waste water tank 60 can be used for recovery of the other fields. This can be done by substituting the coil 62 for one of the field coils such as the coil F1, or by supplementing the field coils F1, F2 and F3 with the waste water coil 62. In operation a temperature probe 66 in the tank 60 senses a usable temperature range and disables the normal field controller 21 (FIG. 2B), thereby shunting the external fields F1, F2 and F3. Heat is extracted until a low temperature solenoid valve 65 is operated, removing water from the tank 60. This outflow can be used for the moistening of the field coils that are buried in the ground. In addition, if waste water enters the tank before all the heat is extracted, the water level control 67 causes the solenoid valve 65 to open until the water level is appropriate for the tank 60.

Figure 4D:
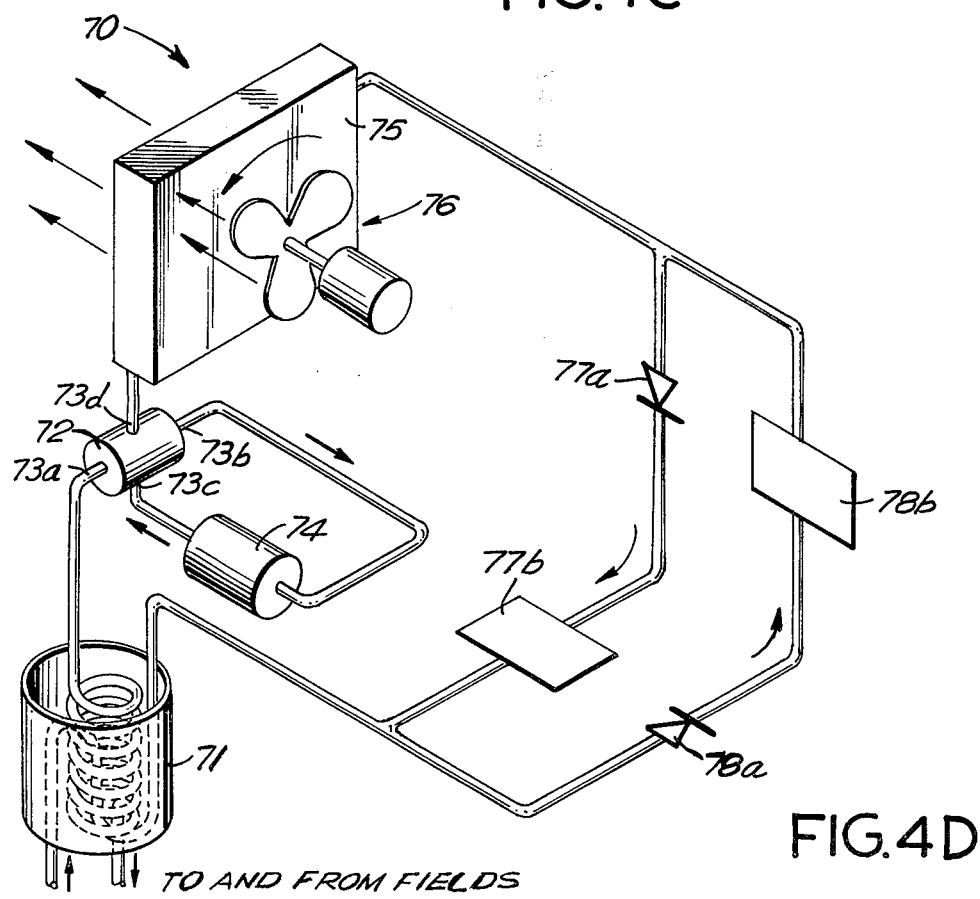
FIG. 4D is a perspective and schematic representation of an illustrative heat pump for use in the practice of the invention.

FIG. 4D shows an illustrative neat transducer 70 for the practice of the invention. Heat exchanged from the fields is pumped to a shell-and-tube heat exchanger 71. At the exchanger 71, when the system is operating in a heating mode, a refrigerant liquid, such as Freon 22, is evaporated and passed through ports 73a and 73b of a four-way valve 72 into a compressor 74. Work is done and the refrigerant vapor is converted from a low temperature, low pressure to a high temperature, high pressure. The vapor temperature is now higher than the temperature of indoor air.

The secondary refrigerant vapor is next condensed in an indoor heat exchanger 75 using a fan 76 to transfer energy from the high temperature vapor to indoor air. The refrigerant then passes through a check valve 77a and an expansion valve 77b, returning to the exchanger 71 in a liquid state at low temperature.

The cycle is repeated. The result is that heat is transferred from a low temperature to a high temperature source. The amount of work needed is small by comparison with the amount of energy transferred. In the cooling mode, the valve 72 is reversed. The flow continues through the compressor 74 as shown, but the inflow is from the indoor exchanger 75 to the outdoor exchanger 71.

It will be apparent that a solar collector, or some other external heat source, including a source operating at a reduced temperature, could be used in the equilibrating scheme by which an interchange is made with the field coils in order to expedite system recovery.

It will be further apparent that flow control in accordance with the invention can take advantage of temperature effects. For example, when the field fluid is at a relatively high temperature, a different flow rate will be advantageous than when the field fluid is at a relatively lower temperature. Flow rates are also influenced by length and other field parameters.

Other aspects of the invention will be apparent to those of ordinary skill in the art.

What is claimed is:

1. A geothermal energy conversion system comprising:
   (i) a heat transducer;
   (ii) a first heat transfer fluid;
   (iii) a plurality of geothermal fields located in the earth each said field having means for circulating the first heat transfer fluid therethrough;
   (iv) control means connected to each said circulating means for selectively operating each said circulating means;
   (v) a second heat transfer fluid;
   (vi) a heat exchanger for transferring heat from the first heat transfer fluid circulated within said field to the second heat transfer fluid in heat exchange relation therewith, or for transferring heat to the first heat transfer fluid circulated within said field from the second heat transfer fluid in heat exchange relation therewith;
   (vii) means for selectively operating the control means to activate said circulating means associated with said given field and thereby circulate the first heat transfer fluid through said given field and through said heat exchanger; and
   (viii) means for circulating said second heat transfer fluid from said heat exchanger to said heat transducer.

2. A system as defined in claim 1 wherein the first heat transfer fluid is water.

3. A system as defined in claim 1 wherein the control means operates said fields in time, pressure, volume, or temperature cycles.

4. A system as defined in claim 1 wherein the means for selectively operating the control means energizes said fields for prescribed intervals of time in accordance with ground conditions.

5. A system as defined in claim 1 wherein the control means dynamically alters the composition of the total field.

6. A system as defined in claim 1 wherein the control means dynamically alters the length of the total field.

7. A system as defined in claim 1 wherein the heat exchanger is interposed between said heat transducer and said fields.

8. A system as defined in claim 7 wherein a closed loop for the circulation of a freeze resistant fluid is provided for said heat transducer.

9. A system as defined in claim 1 wherein said fields are embedded in a medium that enhances geothermal conversion.

10. A system as defined in claim 9 wherein said fields are embedded in sand.

11. A system as defined in claim 9 wherein the embedding media for said fields is maintained in a moistened condition to enhance the thermal coupling between the earth and said fields.

12. A system as defined in claim 11 wherein waste water is used to increase the thermal conductivity between the earth and said fields.

13. A system as defined in claim 1 wherein the control means comprises an electronic regulator.

14. A system as defined in claim 1 wherein a solar collector is used to enhance the heat of at least one of said fields.

15. A system as defined in claim 1 wherein a reversing valve is used to enhance the heat of at least one of the fields.

16. A system as defined in claim 1 wherein piping is used to enhance the thermal transfer of at least one of the fields.

17. A system as defined in claim 1 wherein the flow rate of the first heat transfer fluid is dynamically altered in accordance with the field compositon.

18. A system as defined in claim 1 which further includes a waste water unit for supplementing the heat transfer from the geothermal fields located in the earth.

* * * * *